US012481948B2

(12) United States Patent
Mo et al.

(10) Patent No.: US 12,481,948 B2
(45) Date of Patent: Nov. 25, 2025

(54) METHOD, APPARATUS, ELECTRONIC DEVICE AND STORAGE MEDIUM FOR CONTROLLING MICROSERVICE GOVERNANCE SERVICE

(71) Applicant: Beijing Volcano Engine Technology Co., Ltd., Beijing (CN)

(72) Inventors: Shilin Mo, Beijing (CN); Jinhua Tan, Singapore (SG); Yang Zhang, Beijing (CN); Jiajun Yuan, Beijing (CN); Fan Yang, Beijing (CN); Jun Zhang, Beijing (CN); Wenlong Luo, Beijing (CN); Zhening Zhang, Los Angeles, CA (US)

(73) Assignee: BEIJING VOLCANO ENGINE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/775,670

(22) Filed: Jul. 17, 2024

(65) Prior Publication Data

US 2025/0029048 A1 Jan. 23, 2025

(30) Foreign Application Priority Data

Jul. 17, 2023 (CN) .......................... 202310876964.1

(51) Int. Cl.
*G06Q 10/067* (2023.01)
*G06F 9/448* (2018.01)

(52) U.S. Cl.
CPC ......... *G06Q 10/067* (2013.01); *G06F 9/4494* (2018.02)

(58) Field of Classification Search
CPC .......................... G06Q 10/067; G06F 9/4494
See application file for complete search history.

(56) References Cited

U.S. PATENT DOCUMENTS

2017/0344605 A1\* 11/2017 Wells ................ G06F 16/24535
2018/0196647 A1\* 7/2018 Batinich ................. G06F 9/46
(Continued)

FOREIGN PATENT DOCUMENTS

| CN | 110245035 A | 9/2019 | |
| CN | 1186597 A1 \* | 10/2020 | ......... H04L 63/1416 |

(Continued)

OTHER PUBLICATIONS

Extended European Search Report received for European Application No. 24176887.8, mailed on Nov. 25, 2024, 10 pages.

(Continued)

*Primary Examiner* — Charles E Anya
(74) *Attorney, Agent, or Firm* — Astute IP Law Group

(57) ABSTRACT

Embodiments of the disclosure provide a method, apparatus, electronic device, and storage medium for controlling a microservice governance service. In the method, a first message is received from a business unit. The first message is a remote procedure call message comprising a business request. An action link table is queried by using a message feature of the first message as a query criteria. If a corresponding action link in the action link table is hit, the hit action link is determined as a target action link. The action link table is stored in a microservice governance unit and used for processing the first message to implement a microservice governance for the business unit. The target action link comprises at least two action nodes configured to implement a governance action of the microservice governance. The target action link is run to consecutively execute governance actions corresponding to the action nodes.

20 Claims, 8 Drawing Sheets

(56) References Cited

U.S. PATENT DOCUMENTS

| | | | |
|---|---|---|---|
| 2018/0321996 A1* | 11/2018 | Riva | H04L 67/53 |
| 2019/0102157 A1* | 4/2019 | Caldato | G06F 9/5083 |
| 2019/0197148 A1* | 6/2019 | Engstrand | G06F 16/2365 |
| 2020/0351332 A1* | 11/2020 | Palladino | H04L 67/10 |
| 2021/0037018 A1* | 2/2021 | Joyce | H04L 63/0209 |
| 2021/0117242 A1 | 4/2021 | Van De Groenendaal et al. | |
| 2021/0306321 A1 | 9/2021 | Calegari et al. | |
| 2022/0109733 A1 | 4/2022 | Zhang et al. | |
| 2022/0188104 A1* | 6/2022 | Wan | G06F 9/547 |
| 2022/0342718 A1* | 10/2022 | Iqbal | G06F 9/5077 |

FOREIGN PATENT DOCUMENTS

| | | |
|---|---|---|
| CN | 112612675 A | 4/2021 |
| CN | 113810234 A | 12/2021 |
| CN | 113821335 A | 12/2021 |
| CN | 114172949 A | 3/2022 |
| CN | 114745295 A | 7/2022 |
| CN | 112929230 B | 9/2022 |
| CN | 115878207 A | 3/2023 |
| CN | 115914400 A | 4/2023 |
| WO | 2022/068756 A1 | 4/2022 |

OTHER PUBLICATIONS

Office Action for Chinese Patent Application No. 202310876964.1, mailed on May 21, 2025, 16 pages.

Notification to Grant Patent Right for Invention fo Chinese Patent Application No. 202310876964.1, mailed on Aug. 29, 2025, 7 pages.

"White Paper on Microservices Governance Technology", Alibaba Cloud Native Application Platform Team, Apr. 13, 2022, 380 pages, with English Abstract.

Zhao, "Multi-Language Micro-Service Platform Based on ServiceComb", System Construction, Apr. 15, 2020, 8 pages, with English Abstract.

\* cited by examiner

METHOD, APPARATUS, ELECTRONIC DEVICE AND STORAGE MEDIUM FOR CONTROLLING MICROSERVICE GOVERNANCE SERVICE

CROSS REFERENCE

This application claims the priority to Chinese Patent Application No. 202310876964.1 filed on Jul. 17, 2023, and entitled "Method, Apparatus, Electronic Device and Storage Medium for Controlling Microservice Governance Service", which is hereby incorporated by reference in its entirety.

FIELD

Embodiments of the present disclosure relate to the field of computer technology, and in particular to a method, apparatus, electronic device and storage medium for a controlling microservice governance service.

BACKGROUND

A microservice architecture is a service-oriented development architecture that implements specific business functions through multiple small services that communicate with each other. In the microservice architecture, a microservice governance for microservice is used to control the communication process between microservices, such as service discovery, load balancing, etc.

However, in conventional solutions, microservice governance schemes for the microservice architecture have issues such as low execution efficiency and poor performance.

SUMMARY

Embodiments of the present disclosure provide a method, apparatus, electronic device and storage medium for a controlling microservice governance service to overcome the problems of low execution efficiency and poor performance in microservice governance solutions.

In a first aspect, embodiments of the present disclosure provide a method of controlling a microservice governance service which comprises:
receiving a first message sent by a business unit, wherein the first message is a remote procedure call message including a business request; querying an action link table by using a message feature of the first message as a query criteria; in accordance with a determination that a corresponding action link in the action link table is hit, determining the hit action link as a target action link, wherein the action link table is stored in a microservice governance unit and used for processing the first message to implement a microservice governance for the business unit, the target action link includes at least two action nodes for consecutively executing, and the action nodes are configured to implement a governance action of the microservice governance; and running the target action link to consecutively execute governance actions corresponding to the action nodes.

In a second aspect, embodiments of the present disclosure provide an apparatus for controlling a microservice governance service which comprises:
a receiving module configured to receive a first message sent by a business unit, wherein the first message is a remote procedure call message including a business request;

a querying module configured to query an action link table by using a message feature of the first message as a query criteria; in accordance with a determination that a corresponding action link in the action link table is hit, determine the hit action link as a target action link, wherein the action link table is stored in a microservice governance unit and used for processing the first message to implement a microservice governance for the business unit, the target action link includes at least two action nodes for consecutively executing, and the action nodes are configured to implement a governance action of the microservice governance; and an executing module configured to run the target action link to consecutively execute governance actions corresponding to the action nodes.

In a third aspect, embodiments of the present disclosure provide an electronic device which comprises:
a processor, and a memory connected with the processor, the memory storing computer execution instruction;
the processor executing the computer execution instruction stored in the memory to implement a method for controlling a microservice governance service as described in the first aspect above and in various possible designs of the first aspect.

In a fourth aspect, embodiments of the present disclosure provide a computer-readable storage medium on which computer execution instructions are stored, the computer execution instructions, when executed by a processor, implementing a method for controlling a microservice governance service as described in the first aspect above and in various possible designs of the first aspect.

In a fifth aspect, embodiments of the present disclosure provide a computer program product including a computer program, the computer program, when executed by a processor, implementing a method for controlling a microservice governance service as described in the first aspect above and in various possible designs of the first aspect.

Embodiment of the present provides the method, apparatus, electronic device and storage medium for a controlling microservice governance service, a first message sent by a business unit is received, wherein the first message is a remote procedure call message including a business request; an action link table is queried by using a message feature of the first message as a query criteria; in accordance with a determination that a corresponding action link in the action link table is hit, determining the hit action link as a target action link, wherein the action link table is stored in a microservice governance unit and used for processing the first message to implement a microservice governance for the business unit, the target action link includes at least two action nodes for consecutively executing, and the action nodes are configured to implement a governance action of the microservice governance; and the target action link is runed to consecutively execute governance actions corresponding to the action nodes. The action link table is queried by using the message feature of the first message, and if the query is hit, the target action link which can be quickly executed is obtained, and efficient operation of microservice governance is realized based on the target action link, so that the efficiency and the control performance of the microservice governance function are improved.

BRIEF DESCRIPTION OF THE DRAWINGS

In order to more clearly illustrate the technical solutions in embodiments of the present disclosure or prior art, the following will briefly introduce the accompanying drawings that need to be used in the description of embodiments or prior art, and it will be obvious that the accompanying drawings in the following description are some of embodiments of the present disclosure, and that for the person of ordinary skill in the field, other accompanying drawings can be obtained based on these drawings without giving an effort of creative labor.

DETAILED DESCRIPTION

In order to make the purpose, technical solutions and advantages of embodiments of the present disclosure clearer, the technical solutions in embodiments of the present disclosure will be described clearly and completely in the following in connection with the accompanying drawings in embodiments of the present disclosure, and it is clear that the described embodiments are a part of embodiments of the present disclosure, and not all of embodiments. Based on embodiments in the present disclosure, all other embodiments obtained by a person of ordinary skill in the art without creative labor fall within the scope of protection of the present disclosure.

It should be noted that the user information (including, but not limited to, user device information, user personal information, etc.) and data (including, but not limited to, data used for analysis, data stored, data displayed, etc.) involved in the present disclosure are all authorized by the user or sufficiently authorized by all parties, and that the collection, use, and processing of the relevant data are required to comply with relevant laws and regulations and standards of the relevant countries and regions, and a corresponding operation portal is provided for the user to choose to authorize or reject.

Figure 1:
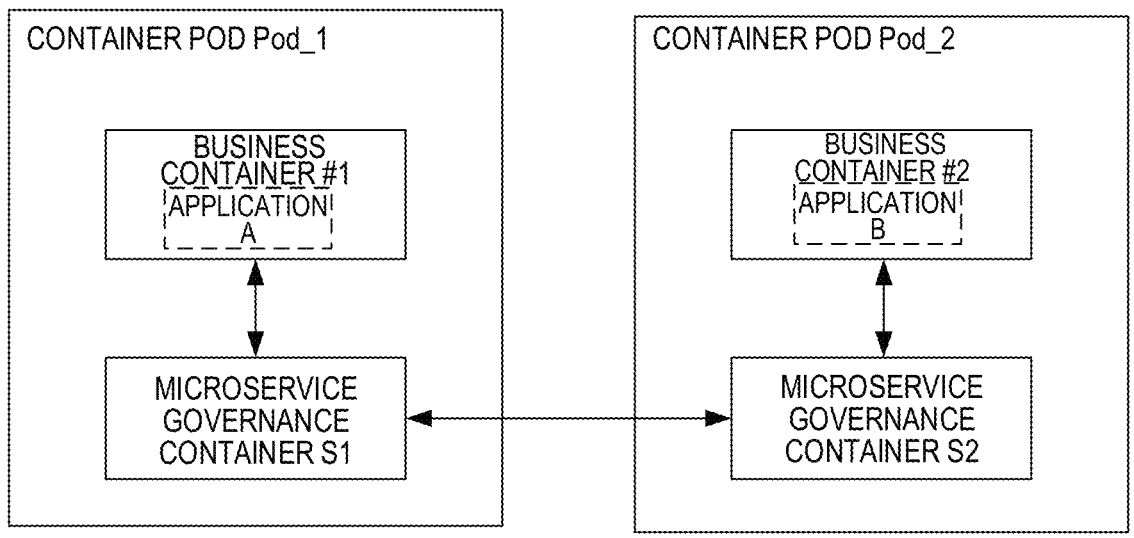
FIG. 1 is a diagram of an application scenario of a method of controlling a microservice governance service provided by embodiments of the present disclosure.

The following is an explanation of the application scenarios of embodiments of the present disclosure:

FIG. 1 is a diagram of an application scenario of a method of controlling a microservice governance service provided by embodiments of the present disclosure. Embodiments of the present disclosure provide a method of controlling a microservice governance service that can be applied to a microservice governance application scenario. Specifically, the method provided by embodiments of the present disclosure can be applied to a server, or a container or container pod (Pod) in a server that provides a microservice governance service. As shown in FIG. 1, the execution body of the method of controlling a microservice governance service provided in the present embodiment is a container S1, and in the container pod Pod_1, there is deployed a business container #1 running the application A (a microservice), and a microservice governance container S1 (hereinafter referred to as the container S1) communicating with the business container #1; the container S1 is used for realizing the microservice governance for the application A. Similarly, in the container pod Pod_2, there is deployed a business container #2 running application B (microservice), and a microservice governance container S2 (hereinafter referred to as container S2) that communicates with the business container #2. Container S2 is used to realize microservice governance for application B. In a specific application, when the business container #1 in the container pod Pod_1 needs to interact with the business container #2 in the container pod Pod_2 based on business logic, the business container #1 in the container pod Pod_1 first sends a message to the container S1, which is processed by the container S1 and then sent to the container S2 used for realizing the microservice governance in the container pod Pod_2, and after that, the container S2 is forwarded to the business container S2. In the process, functions such as service discovery, load balancing, health checking, dynamic routing, flow limiting, speed limiting, fusing, and other microservice governance are accomplished by container S1 and container S2.

In existing technology, a microtask governance container for microservice governance, after receiving a business message sent by a business container, needs to parse the specific content of the business message, and execute the corresponding microservice governance logic with the specific content of the business message as a parameter, so as to realize microservice governance for the business container. The microservice governance logic, however, includes steps of parameter running and logical branching judgment (e.g., if and case statements), and each time the business message is processed, the above steps in the microservice governance logic need to be executed to realize the process of microservice governance for the business message, thus causing problems such as increased time consumption and low processing efficiency, and affecting the execution efficiency and performance of the microservice governance. Embodiments of the present disclosure provide a method of controlling a microservice governance service to solve the above problems.

Figure 2:
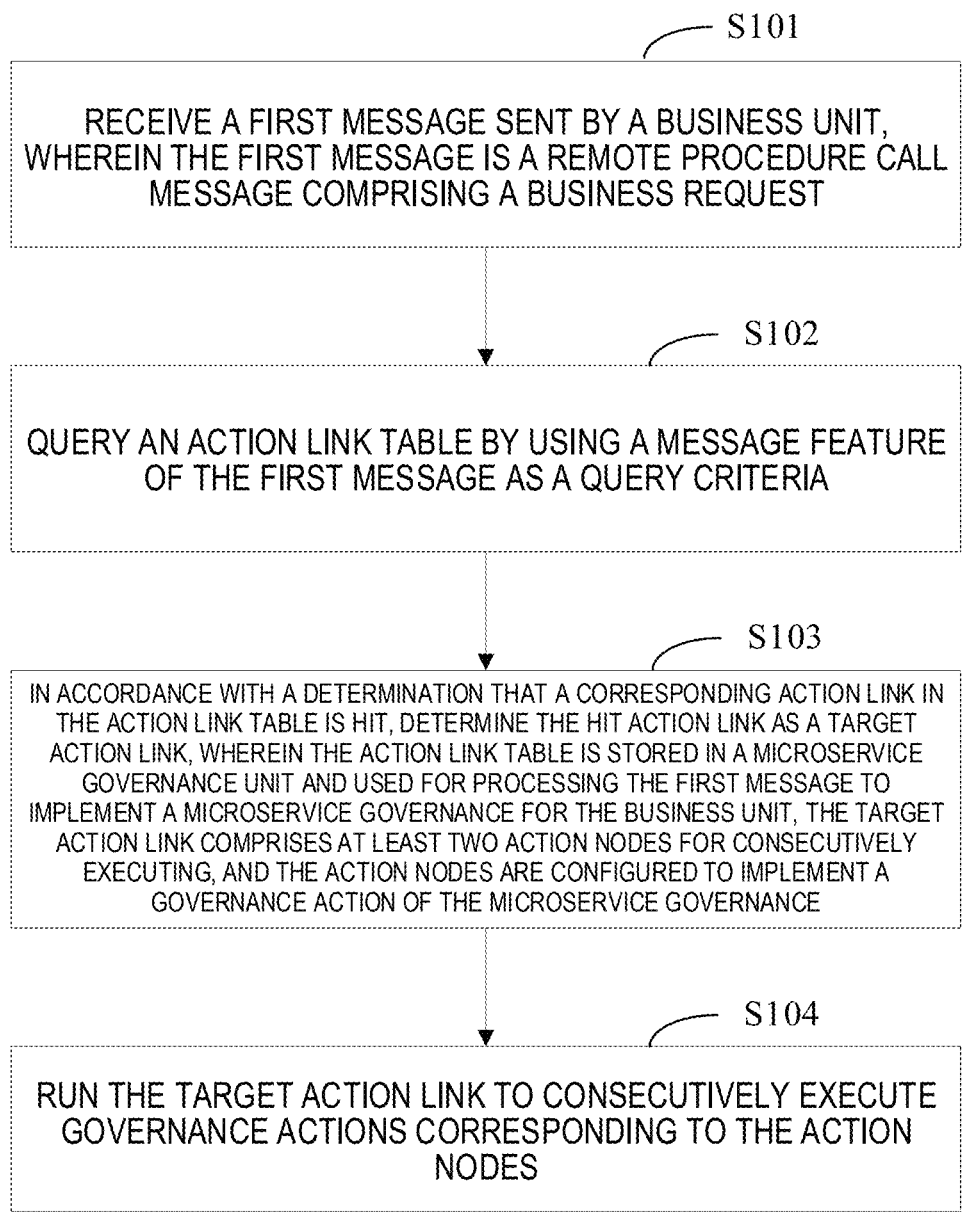
FIG. 2 is a schematic flowchart I of the method of controlling a microservice governance service provided by embodiments of the present disclosure.

Reference is made to FIG. 2, which is a flowchart I of the method of controlling a microservice governance service provided by embodiments of the present disclosure. The method of embodiment can be applied to electronic devices running container or container pod, and the method of controlling a microservice governance service includes:

Step S101: receive a first message sent by a business unit, wherein the first message is a remote procedure call message including a business request.

Step S102: query an action link table by using a message feature of the first message as a query criteria.

Step S103: in accordance with a determination that a corresponding action link in the action link table is hit, determine the hit action link as a target action link, wherein the action link table is stored in a microservice governance unit and used for processing the first message to implement a microservice governance for the business unit, the target action link includes at least two action nodes for consecutively executing, and the action nodes are configured to implement a governance action of the microservice governance.

For example, referring to the application scenario diagram shown in FIG. 1, the execution body of the method of controlling a microservice governance service provided in embodiment is a microservice governance unit. Specifically, the microservice governance unit can be, for example, container S1 shown in FIG. 1, or other containers connected to container S1, which are collectively referred to as the microservice governance unit in embodiment, and, accordingly, the functional unit running the application (microservice), such as business container #1 shown in FIG. 1, is the business unit in embodiment. In response to the execution of application functions, the business unit sends a first message to other external business units, such as the business container #2 shown in FIG. 1. The microservice governance unit receives the first message sent by the business unit and executes corresponding microservice governance based on the first message. where the first message is a Remote Procedure Call (RPC) message, which is used to represent specific business requests of the business unit, such as login, query, message sending, etc.

In one possible implementation, the microservice governance unit is deployed in a sidecar container, a business unit is deployed in a business container, and the sidecar container and the business container are located in a same container pod; and the sidecar container is implemented based on a first process in the container pod, and the business container is implemented based on a second process in the container pod.

Figure 3:
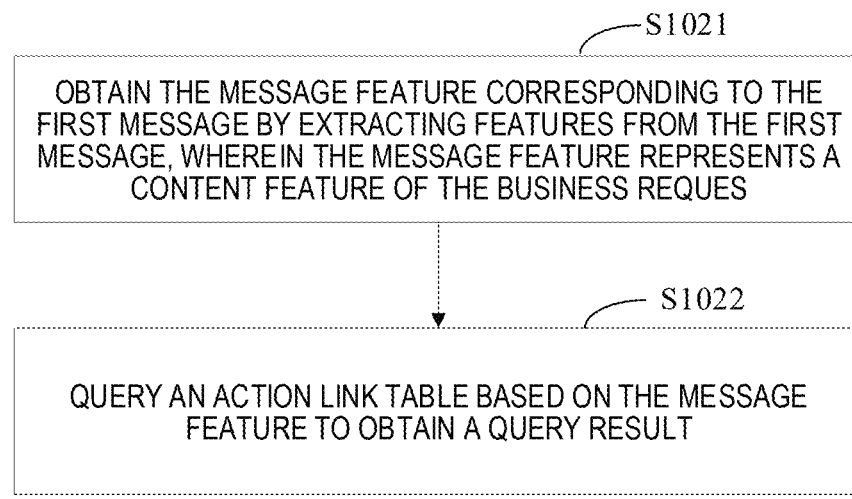
FIG. 3 is a flowchart of a specific realization of step S102 of embodiment shown in FIG. 2.

For example, after the microservice governance unit obtains the first message, the first message is parsed to obtain a message feature corresponding to the first message. Where, the message feature represents the content of the business request represented by the first message. In one possible implementation, as shown in FIG. 3, a specific implementation of step S102 includes:

Step S1021: obtain the message feature corresponding to the first message by extracting features from the first message, wherein the message feature represents a content feature of the business request.

Step S1022: query an action link table based on the message feature to obtain a query result.

For example, after decoding the first message sent by the business unit, a decoding message corresponding to the first message is obtained. The decoding message may include multiple message fields or sub messages. Taking the implementation of the message field as an example, each message field represents a dimension of descriptive information or parameters of the business request. For example, the sending time of business request, the sender and receiver of business request, and the specific request content of business request. where, the microservices governance unit reads one or more message fields (i.e. target fields) in the first message and combines the read field values to obtain message features that represent the content feature of business requests. More specifically, the message feature can be feature matrices that represent the content feature of business request, or identifiers that represent the content type of business request. Afterwards, taking message feature as input, the action link table is queried, which includes multiple action links. Each action link includes at least two action nodes for consecutively executing. The action nodes are configured to implement a governance action of the microservice governance. When the action link is executed, the action nodes in the action link will be sequentially executed to achieve microservices governance for the first message (business unit), such as speed limit, circuit breaker, dynamic path, service discovery, etc. That is, the action link table includes multiple microservice governance rules, so this action link table can also be called a rule-table. Meanwhile, in the action link table, each action link corresponds to a unique index, which is implemented in the form of message feature. That is, using the message feature as the index for querying the action link table, If it is hit, the action link indexed by the message features, i.e. the target action link, can be obtained, and the target action link and/or the query result representing the query hit can be returned; If it fails to hit, the query result represents the query not hit is returned.

Figure 4:
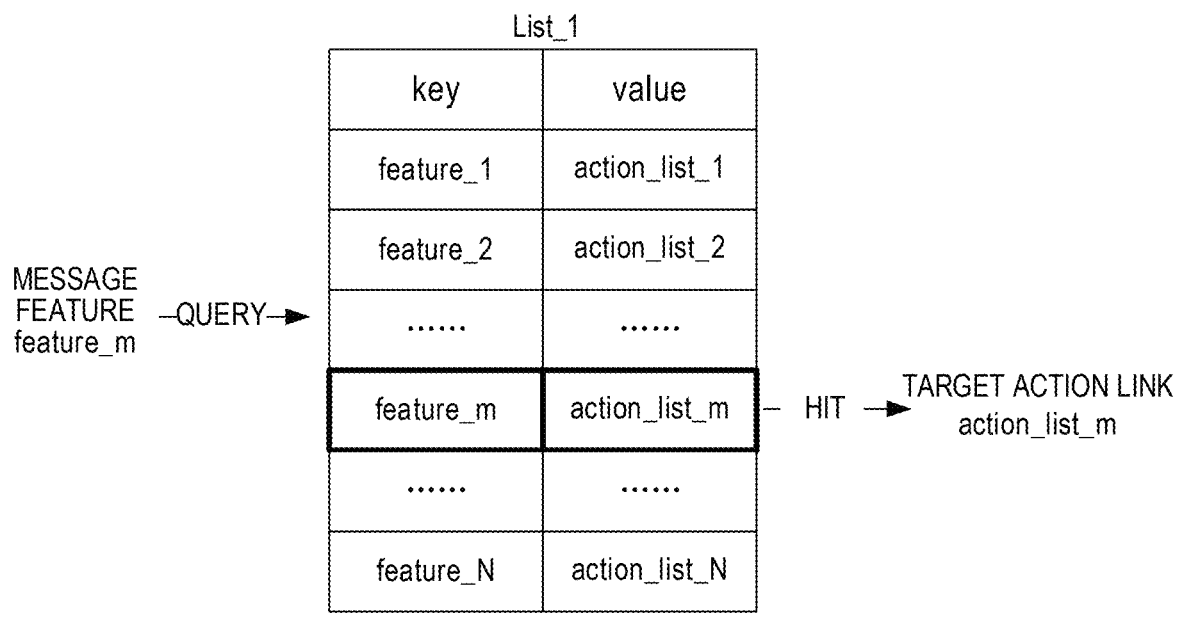
FIG. 4 is a schematic diagram of a query of an action link table provided by embodiments of the present disclosure.

Further, FIG. 4 is a schematic diagram of a query of an action link table provided by embodiments of the present disclosure, as shown in FIG. 4. After obtaining the message feature feature_m corresponding to the first message, the action link table list_1 is queried with the message feature feature_m as input. The action link table list_1 is a relational table, which includes two attributes: feature identifier (key) and link identifier (value), where the feature identifier represents the message feature and the link identifier represents the action link; Each row in the action link table list_1 represents a mapping instance (rule), that is, the mapping between message feature and corresponding action link, as shown in the FIG.. The action link corresponding to message feature feature_1 is action_list_1, which is used for implementing microservice governance of "speed limit routing"; The action link corresponding to message feature feature_2 is action_list_2, which is used for microservice governance such as "authentication function A function B"; Similarly, the action link table includes N mapping instances, that is, the action link corresponding to the message feature feature-N is action_list-N. When the action link table list_1 includes a mapping instance with the key feature_m, using feature_m to query the action link table list_1 can hit the index (key) feature_m in the action link table, thereby obtaining the action link action_list_m corresponding to feature_m, which is the target action link. When the action link table list_1 does not include a mapping instance with the key feature_m, it cannot be hit.

Step S104: run the target action link to consecutively execute governance actions corresponding to the action nodes.

Figure 5:
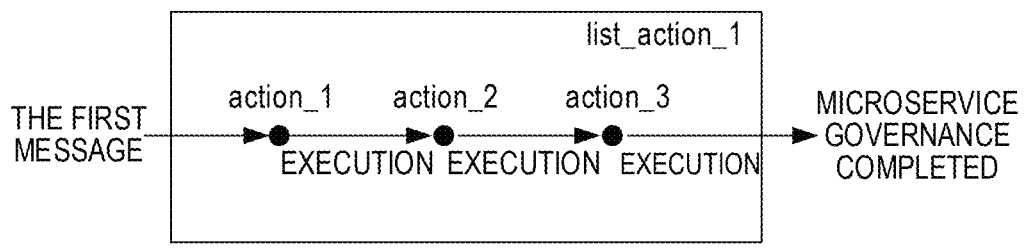
FIG. 5 is a schematic diagram of a target action link provided by embodiment of the present disclosure.

For example, after obtaining the target action link, based on running the target action link, the function of the corresponding microservice governance can be achieved by continuously executing the action nodes in the target action link. Specifically, the action link table is stored within the microservices governance unit and is maintained by the microservices governance unit. The target action link (one of multiple action links) in the action link table includes a plurality of action nodes that can be continuously executed, and each action node executes a responsive governance action after it is triggered, and the plurality of governance actions jointly complete the process of microservice governance once, i.e., the governance action is equivalent to a link of the user's realization of microservice governance. FIG. 5 is a schematic diagram of a target action link provided by embodiment of the present disclosure, as shown in FIG. 5. The target action link list-action_1 is an action link used to implement a specific microservice governance logic. The target action link includes three action nodes, namely action_1, action_2, and action_3, where action_1 is used to implement the governance action of "speed limit"; Action_2 is used to implement the governance action of "routing"; Action_3 is used to implement the governance action of "load balancing". Through the target action link, the first input message is sequentially processed to achieve microservice governance for the first message. In existing technology, using predetermined microservice governance logic to complete the above process, it is necessary to perform condition judgment and parameter acquisition based on the execution result of the first action after the execution of the first action (action_1), determine the second action to be executed after that (action_2), and then execute the second action, and then execute the third action (action_3) after going through the same condition judgment and parameter acquisition steps. In embodiment of the present application, the above three action nodes can be executed consecutively without the need to perform additional steps such as condition judgment and parameter acquisition, which is equivalent to a "fast path" for realizing microservice governance, and has a higher execution efficiency compared with the solutions in the prior art.

In embodiment of the present, by receiving a first message sent by a business unit, wherein the first message is a remote procedure call message including a business request; querying an action link table by using a message feature of the first message as a query criteria; in accordance with a determination that a corresponding action link in the action link table is hit, determining the hit action link as a target action link, wherein the action link table is stored in a microservice governance unit and used for processing the first message to implement a microservice governance for the business unit, the target action link includes at least two action nodes for consecutively executing, and the action nodes are configured to implement a governance action of the microservice governance; and running the target action link to consecutively execute governance actions corresponding to the action nodes. By querying the action link table using the message feature of the first message, in accordance with the query hits, the target action link that is fast enough to be executed is obtained, and efficient operation of the microservice governance is realized based on the target action link, thereby improving the efficiency and control performance of the microservice governance function.

Figure 6:
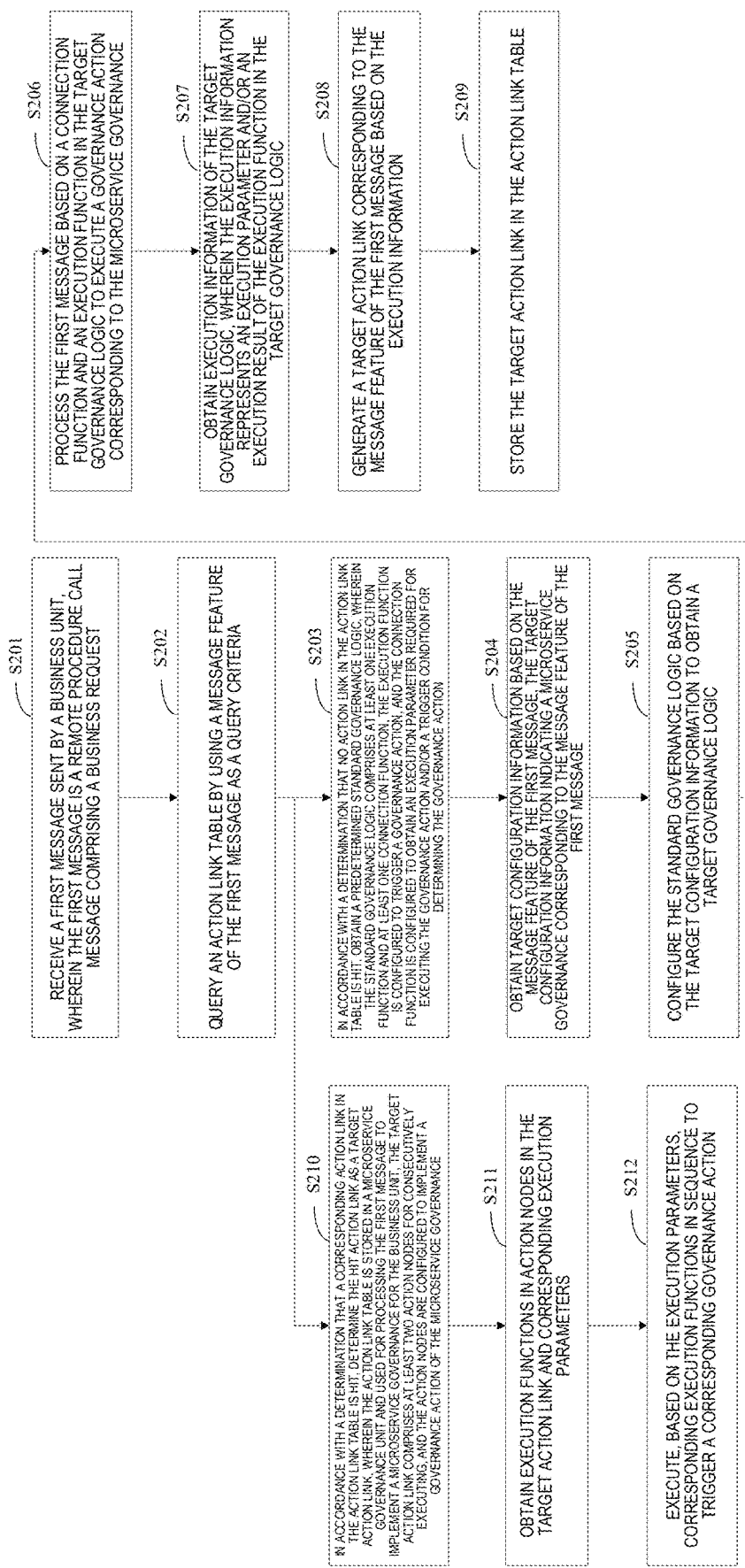
FIG. 6 is a schematic flowchart II of a method of controlling a microservice governance service provided by embodiments of the present disclosure.

Reference is made to FIG. 6, which is a flowchart II of a method of controlling a microservice governance service provided by embodiments of the present disclosure. In the detailed descriptions of these embodiments, on the basis of the embodiments shown in FIG. 2, a processing step is added in the case where no action link is hit. The method of controlling a microservice governance service includes:

Step S201: receive a first message sent by a business unit, wherein the first message is a remote procedure call message including a business request.

Step S202: query an action link table by using a message feature of the first message as a query criteria.

Step S203: in accordance with a determination that no action link in the action link table is hit, obtain a predetermined standard governance logic, wherein the standard governance logic includes at least one execution function and at least one connection function, the execution function is configured to trigger a governance action, and the connection function is configured to obtain an execution parameter required for executing the governance action and/or a trigger condition for determining the governance action.

For example, after querying the action link table with the message feature as the query conditioning, if the corresponding action link is not hit, that is, the rules for processing the message features are not saved in the action link table, the "fast path" of the microservice governance for the first message cannot be realized (refer to the description in the embodiment shown in FIG. 2). In such a case, a predetermined standard governance logic is obtained, which is the processing logic used to process the first message sent by the business unit to realize the processing logic for microservice governance. The standard governance logic includes logical steps for judging the first message, determining the function matching the first message, and executing the action matching the first message, and is therefore equivalent to a target action link, which is slow in execution efficiency and is equivalent to a "slow path" for realizing microservice governance. Specifically, the standard governance logic includes at least one execution function and at least one connection function, the execution function is used to trigger the governance action, and the connection function is used to obtain the execution parameters required for the execution of the governance action, and/or is used to determine the triggering conditions of the governance action. Among them, the connection function is, for example, an if function, a switch-case function, and the like, for judging the first message or a message feature corresponding to the first message, so as to determine a governance action for processing the first message.

Figure 7:
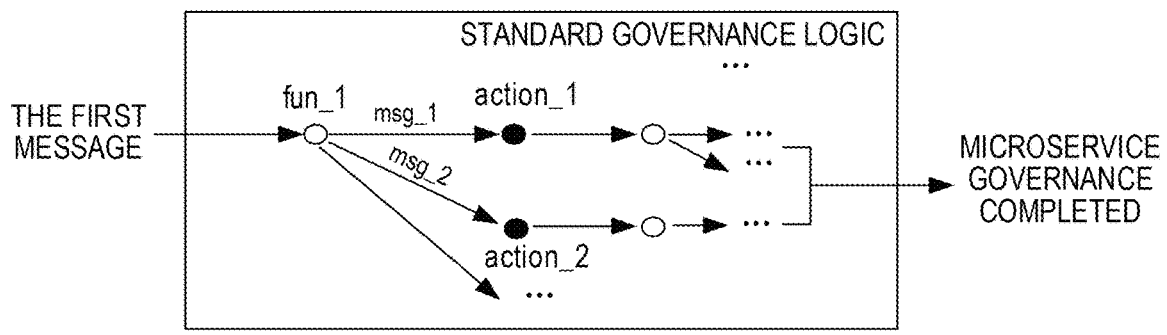
FIG. 7 is a schematic diagram of an execution process of a standard governance logic provided by embodiments of the present disclosure.

FIG. 7 is a schematic diagram of an execution process of a standard governance logic provided by embodiments of the present disclosure, as shown in FIG. 7. The standard governance logic includes a connection function fun_1, For example, the connection function fun_1 is, for example, a switch( ) function, and a message feature of an input first message is determined by the connection function fun_1, and when the message feature of the first message is msg_1, after processing by the connection function fun_1, the corresponding execution function action_1 is determined, and the first message is processed by the execution function action_1 to realize the corresponding governance action; and when the message feature of the first message is msg_2, after processing by the connection function fun_1, the corresponding execution function action_2 is determined, and the first message is processed by the execution function action_2 to realize the corresponding governance action; afterward, For example, after the execution of the execution function action_1 or the execution function action_2 is completed, based on the standard governance logic, other connection functions are also set up after the two, and according to the specific execution results of the execution function action_1 or the execution function action_2, the subsequent corresponding connection functions are executed, and further judgment is performed until the end of the standard governance logic is reached, completing the microservice governance process for the first message. As can be seen from the above process, since the connection function needs to be executed at least one more time in the process of executing the standard governance logic, the execution is less efficient and more time-consuming compared to the action link (including the target action link) that does not contain a connection function. However, in the case where there is no target action link stored in the action link table that matches the message features of the first message, the same microservice governance goal can be achieved through the standard governance logic.

- Step S204: obtain target configuration information based on the message feature of the first message, the target configuration information indicating a microservice governance corresponding to the message feature of the first message.
- Step S205: configure the standard governance logic based on the target configuration information to obtain a target governance logic.
- Step S206: process the first message based on a connection function and an execution function in the target governance logic to execute a governance action corresponding to the microservice governance.

For example, steps S204-steps S206 are specific implementation processes for realizing microservice governance based on standard governance logic. Specifically, after obtaining the first message, corresponding message features are extracted based on the first message, and the specific realization can be referred to the introduction of the corresponding portion of the embodiment shown in FIG. 2 and will not be repeated herein. Afterwards, based on the message features, corresponding target configuration information is obtained, For example, the target configuration information, i.e., configuration information used to configure the standard governance logic so as to enable it to realize the microservice governance function for the first message, where the standard governance logic may be realized based on a function, a method, and the target configuration information may be regarded as an input value of the standard governance logic (the corresponding function, method). Therefore, the process of obtaining the target configuration information based on the message feature is equivalent to the process of converting the message feature into input parameters that can be accepted by the standard governance logic (the corresponding function, method), and the specific realization process is determined according to the specific realization method of the standard governance logic (of the function, method of constructing the function), and is not limited herein.

Afterwards, the standard governance logic is configured based on the target configuration information, which is equivalent to setting input values for the standard governance logic, and after the standard governance logic is configured, a corresponding governance logic, i.e., the target governance logic, is determined based on each governance action of the microservice governance indicated by the target configuration information. Further, the target governance logic includes a connection function and an execution function required for realizing the microservice governance corresponding to the first message, after which the connection function and the execution function in the target governance logic are executed using the first message as input, so that the connection function and the execution function in the target governance logic sequentially process the first message, thereby executing the respective governance actions corresponding to the microservice governance.

For example, after step S206, it further includes:

- Step S207: obtain execution information of the target governance logic, wherein the execution information represents an execution parameter and/or an execution result of the execution function in the target governance logic.
- Step S208: generate a target action link corresponding to the message feature of the first message based on the execution information.
- Step S209: store the target action link in the action link table.

For example, based on the introduction in the previous embodiment, after querying the action link table with the message feature of the first message as the query condition, if the target action link is hit, the target action link can be executed, thus realizing the "fast path" of microservice governance, and improving the fast and efficient execution of the microservice governance function; however, if the target action link is not hit, the standard governance logic can only be used to govern the connection function and execution function in turn, thus realizing the "slow path" of microservice governance. Therefore, in order to increase the triggering probability of the "fast path", that is, to increase the probability of hitting the target action link when querying the action link table with the message feature of the first message as the query condition, after each execution of the target governance logic (slow path), the target action link corresponding to the message feature of the first message is generated based on the message feature of the first message and the execution information of the target governance logic, and store the target action link and the corresponding message feature of the first message in the action link table, thereby realizing the expansion of the action link table. When the message feature of the first message are used as the query condition to query the action link table again, the target action link can be hit, thus realizing the "fast path" of microservice governance.

Figure 8:
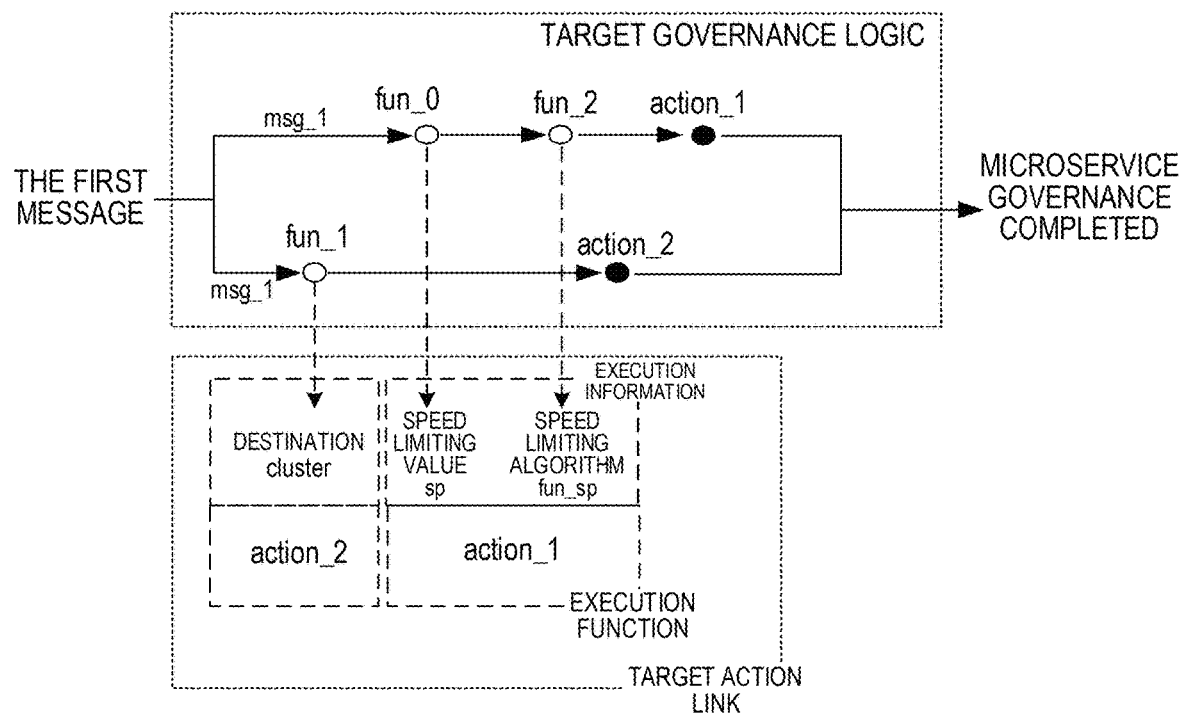
FIG. 8 is a schematic diagram of a process of generating a target action link and storing it provided by embodiments of the present disclosure.

FIG. 8 is a schematic diagram of a process of generating a target action link and storing it provided by embodiments of the present disclosure. The above process is described in detail in conjunction with FIG. 8. For example, as shown in FIG. 8, in the process of determining a target governance logic and running it based on the target configuration information, the execution parameter of each execution function and the corresponding execution result are recorded, e.g., as shown in FIG., the target governance logic includes the connection function fun_0, connection function fun_1, and connection function fun_2, and execution function action_0, and execution function action_1, and execution function action_2, and the logical relationship between each of the connection functions and the execution functions is shown with reference to the FIG. In the process of executing the above-described target governance logic based on the message feature msg_1 of the first message, the message feature msg_1, first passes through the connection function fun_0 and the connection function fun_1, wherein the connection function fun_0 is used to query the speed limit table according to msg_1 to obtain the speed limit value sp; the connection function fun_1 is used to query the routing table according to msg_1 to obtain the destination cluster cluster; after the connection function fun_0 is executed, the connection function fun 2 is then executed where the connection function fun_2 is used to determine the corresponding speed limit algorithm fun_sp according to the speed limit value sp; after executing the connection function fun_1, the execution function action_1 is run, and the execution function action_1 is used to realize the routing function of the first message; after executing the connection function fun_2, the execution function action_2 is run, and the execution function action_2 is used to realize the speed limit of the first message. Meanwhile, after the execution of the execution function action_1 and the execution function action_2 is successfully executed, the microservices governance unit saves the input parameters of execution function action_1 and execution function action_2, as well as execution function action_1 and execution function action_2, namely the speed limit value sp, destination cluster cluster, and speed limit algorithm fun_sp, as the target action link, where the above input parameters: the speed limit value sp, the destination cluster cluster, and the speed limit algorithm fun_sp are the execution information, and the execution function and the corresponding execution information, constitute an action node of the action link. Afterwards, this target action link and the corresponding message feature msg_1 are stored as rule instances in an action link table.

In embodiment of present, by generating a target action link corresponding to the message feature of the first message based on the execution information after the execution of the target governance logic, and storing it in the action link table, the target action link corresponding to the message feature of the first message is realized to be saved. In the subsequent processing of the first message having the same message feature, the micro-service governance function for the first message can be realized based on the target action link, thereby realizing a "fast path" and improving the efficiency of micro-service governance.

On the other hand, the method further includes:

Step S210: in accordance with a determination that a corresponding action link in the action link table is hit, determine the hit action link as a target action link, wherein the action link table is stored in a microservice governance unit and used for processing the first message to implement a microservice governance for the business unit, the target action link includes at least two action nodes for consecutively executing, and the action nodes are configured to implement a governance action of the microservice governance.

Step S211: obtain execution functions in action nodes in the target action link and corresponding execution parameters.

Step S212: execute, based on the execution parameters, corresponding execution functions in sequence to trigger a corresponding governance action.

For example, the action node includes at least one execution function and a corresponding execution parameter for triggering the governance action, and in the process of executing the target action link, with reference to the above process of generating the target action link, each action node in the target action link includes a corresponding execution function and a corresponding execution parameter, and after hitting the target action link, the execution function and the corresponding execution parameter of the respective action node are obtained in turn, and then based on each execution parameter, the corresponding execution function is executed in turn to trigger the corresponding governance action, thus realizing the same microservice governance effect as the target governance logic, and at the same time, since there is no need to execute the connection function, it has the advantages of high execution efficiency and less time-consuming compared with the target governance logic.

Figure 9:
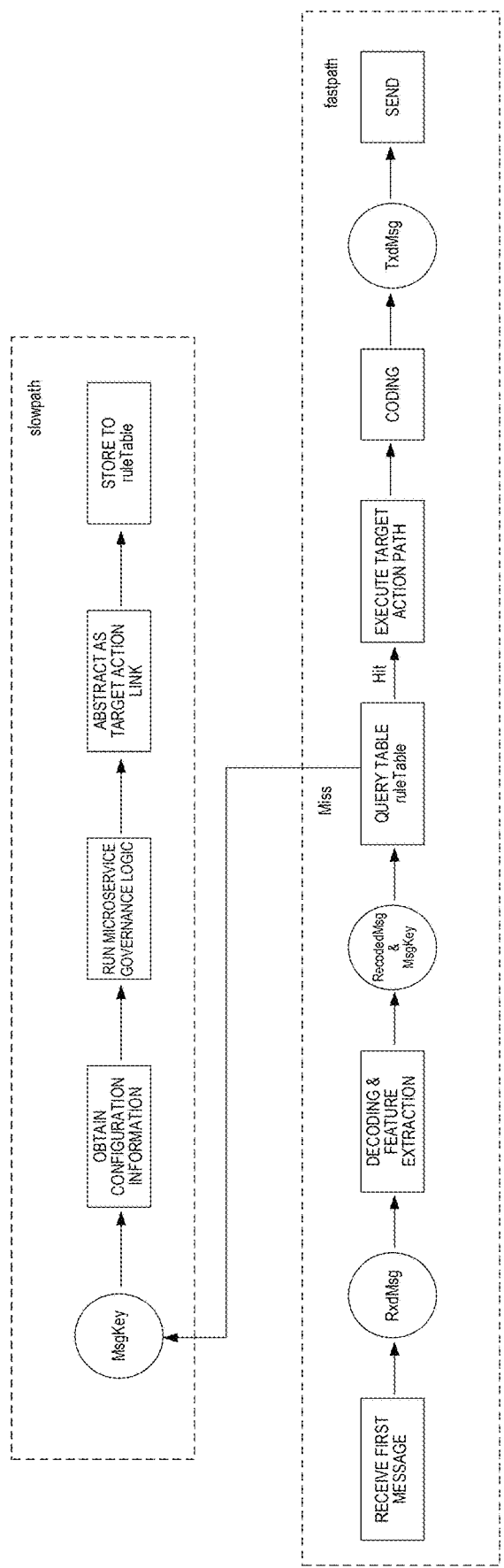
FIG. 9 is a schematic diagram of a process of executing microservice governance provided by embodiments of the present disclosure.
Figure 10:
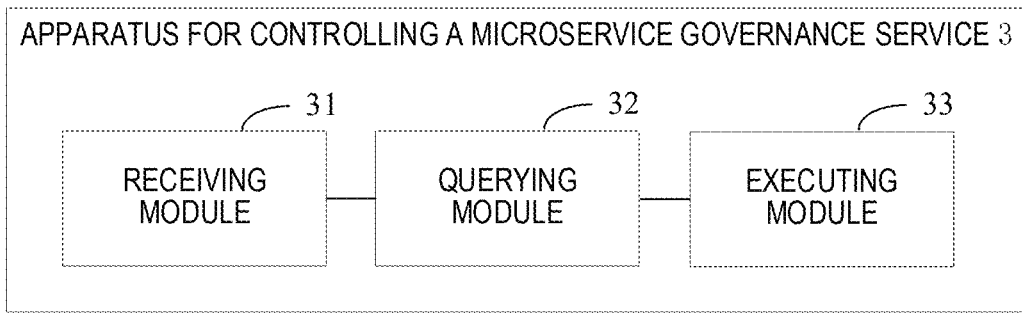
FIG. 10 is a block diagram of a structure of an apparatus for controlling a microservice governance service provided by embodiments of the present disclosure.

FIG. 9 is a schematic diagram of a process of executing microservice governance provided by embodiments of the present disclosure. The above process is further introduced with reference to FIG. 10. As shown in FIG. 10, the microservice governance unit first receives a first message (RxdMsg), decodes and extracts features from the first message, obtains the corresponding decoded message (RecodedMsg) and message feature (Msgkey), and query the action link table (ruleTable) based on the message feature, and performs slow path if there is no hit (miss), i.e., the first occurrence of the message feature. Specifically, configuration information is obtained based on the message feature, and then according to configuration information, running microservice governance logic (i.e. target governance logic) to realize microservice governance for the first message, generate a second message, and sending the second message to the corresponding receiving end. Afterwards, the successfully running microservice governance logic is abstracted as the target action link, and the target action link is stored in the action link table to complete the supplementation and update of the action links in the action link table; On the other hand, the action link table action link table is queried with the message feature, and if a hit, i.e., when the message feature occurs at least for the second time, the target action link corresponding to the fast path is executed, e.g., to realize the microservice governance of speed limiting, routing, and load balancing, and then the decoded message corresponding to the first message that completes the microservice governance is encoded to generate a encoded second message, the second message is equivalent to the result of microservice governance for the first message, and the second message is sent to the corresponding receiving end. By means of the scheme of microservice governance provided by the present embodiment, it is possible to realize automatic abstraction of a message feature appearing for the first time into an action path, so as to realize rapid execution of the microservice governance when the message feature appears for the second time, and to improve the operational efficiency of the microservice governance.

In embodiment of the present, steps S201-steps S202 are realized in the same manner as steps S101-steps S102 in the embodiment shown in FIG. 2 of the present disclosure, and will not be repeated herein.

Corresponding to the method of controlling a microservice governance service of embodiments above, FIG. 10 is a block diagram of a structure of an apparatus for controlling a microservice governance service provided by embodiments of the present disclosure. For ease of illustration, only portions relevant to the embodiments of the present disclosure are shown. Reference is made to FIG. 10, the apparatus for controlling a microservice governance service 3 includes:

a receiving module 31 configured to receive a first message sent by a business unit, wherein the first message is a remote procedure call message including a business request;

a querying module configured to query an action link table by using a message feature of the first message as a query criteria; in accordance with a determination that a corresponding action link in the action link table is hit, determine the hit action link as a target action link, wherein the action link table is stored in a microservice governance unit and used for processing the first message to implement a microservice governance for the business unit, the target action link includes at least two action nodes for consecutively executing, and the action nodes are configured to implement a governance action of the microservice governance;

an executing module configured to run the target action link to consecutively execute governance actions corresponding to the action nodes.

In an embodiment of the present disclosure, the querying module 32 is further configured to: in accordance with a determination that no action link in the action link table is hit, obtaining a predetermined standard governance logic, wherein the standard governance logic includes at least one execution function and at least one connection function, the execution function is configured to trigger a governance action, and the connection function is configured to obtain an execution parameter required for executing the governance action and/or a trigger condition for determining the governance action; obtaining target configuration information based on the message feature of the first message, the target configuration information indicating a microservice governance corresponding to the message feature of the first message; configuring the standard governance logic based on the target configuration information to obtain a target governance logic; and processing the first message based on a connection function and an execution function in the target governance logic to execute a governance action corresponding to the microservice governance.

In an embodiment of the present disclosure, after processing the first message based on the connection function and the execution function in the target governance logic to execute each governance action corresponding to the microservice governance, the method further comprises: obtaining execution information of the target governance logic, wherein the execution information represents an execution parameter and/or an execution result of the execution function in the target governance logic; generating a target action link corresponding to the message feature of the first message based on the execution information; and storing the target action link in the action link table.

In an embodiment of the present disclosure, the querying module 32, when querying an action link table by using a message feature of the first message as a query criteria, is specifically used for: obtaining the message feature corresponding to the first message by extracting features from the first message, wherein the message feature represents a content feature of the business request; and querying an action link table based on the message feature to obtain a query result.

In an embodiment of the present disclosure, the querying module 32, when the obtaining the message feature corresponding to the first message by extracting features from the first message, is specifically used for: decoding the first message to obtain a decoded message; and obtaining the message feature based on a field value of a target field of the decoded message.

In an embodiment of the present disclosure, the action link table includes a feature identifier for representing a message feature of a first message and a link identifier for mapping an action link that matches the message feature.

In an embodiment of the present disclosure, the action node includes at least one execution function for triggering a governance action and a corresponding execution parameter; Executing module 33 is specifically used for: obtaining execution functions in action nodes in the target action link and corresponding execution parameters; and executing, based on the execution parameters, corresponding execution functions in sequence to trigger a corresponding governance action.

In an embodiment of the present disclosure, at least one of the following is included: a microservice governance unit is deployed in a sidecar container, a business unit is deployed in a business container, and the sidecar container and the business container are located in a same container pod; and the sidecar container is implemented based on a first process in the container pod, and the business container is implemented based on a second process in the container pod.

Among them, the receiving module 31, the querying module 32, and the executing module 33 are sequentially connected. The apparatus for controlling a microservice governance service 3 provided in embodiment can execute the technical solution of the above embodiment of method, and its implementation principle and technical effect are similar, embodiment will not be repeated herein.

Figure 11:
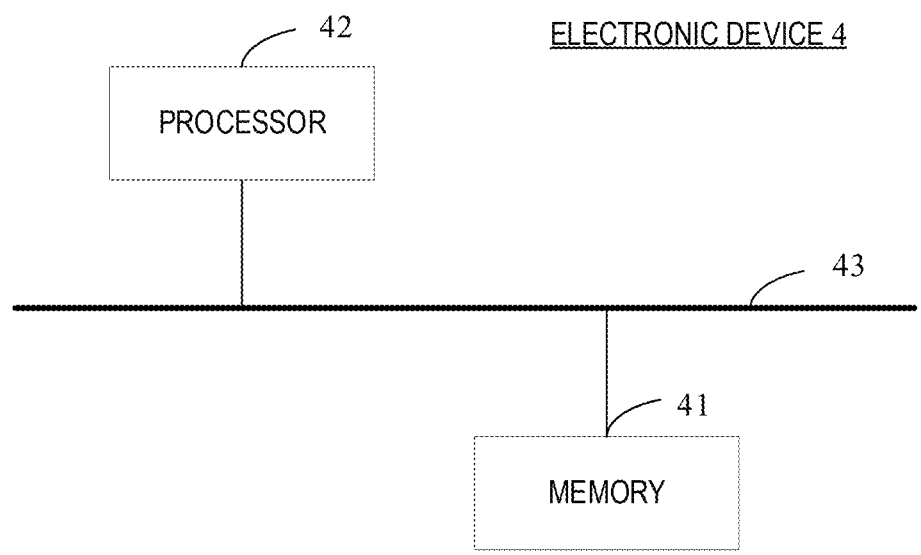
FIG. 11 is a schematic diagram of a structure of an electronic device provided by embodiments of the present disclosure.

FIG. 11 is a schematic diagram of a structure of an electronic device provided by embodiments of the present disclosure, as shown in FIG. 11. The electronic device 4 includes:

a processor 41, and a memory 42 connected with the processor 41, the memory 42 storing computer execution instruction;

the processor 41 executing the computer execution instruction stored in the memory 42 to implement a method for controlling a microservice governance service as in embodiment shown in FIG. 2-FIG. 9.

Where, Optionally, the processor 41 and memory 42 are connected via a bus 43.

The relevant explanations can be understood by referring to the relevant descriptions and effects corresponding to the steps in embodiments shown in FIG. 2-FIG. 9, and will not be elaborated too much herein.

Embodiments of the present disclosure provide a computer-readable storage medium, the computer-readable storage medium storing computer-executable instructions, the computer-executable instructions when executed by a processor being used to implement the method of controlling a microservice governance service provided in any of the embodiments corresponding to FIG. 2-FIG. 9 of the present disclosure.

Embodiments of the present disclosure provide a computer program product including a computer program that when executed by a processor implements a method of controlling a microservice governance service as provided in the embodiments shown in FIG. 2-FIG. 9.

Figure 12:
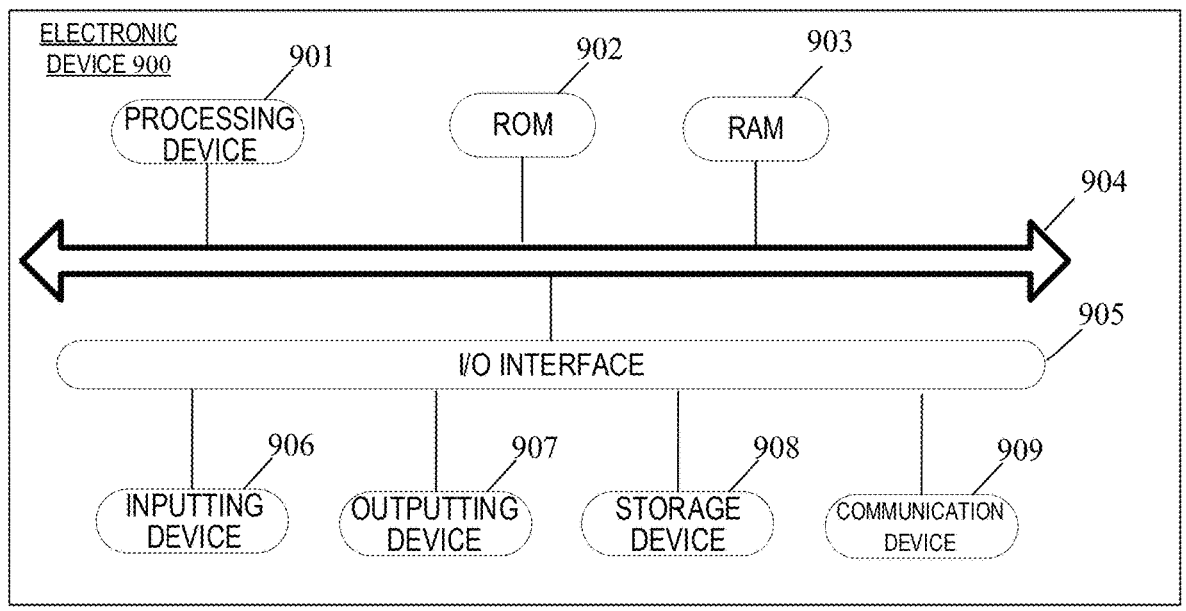
FIG. 12 is a schematic diagram of a hardware structure of an electronic device provided by embodiments of the present disclosure.

Reference is made to FIG. 12, which illustrates a schematic diagram of a structure of an electronic device 900 suitable for use in implementing embodiments of the present disclosure. The electronic device 900 may be a terminal device or a server. where the terminal device may include, but is not limited to, devices such as a cell phone, a laptop computer, a digital broadcast receiver, a Personal Digital Assistant (PDA), a Portable Android Device (PAD), a Portable Multimedia Player (PMP), an in-vehicle terminal (e.g., a vehicle-mounted terminal), and a server. Media Player (PMP), in-vehicle terminal (e.g., in-vehicle navigation terminal), and the like mobile terminals, and fixed terminals such as digital TV, desktop computer, and the like. The electronic device illustrated in FIG. 12 is merely an example and should not impose any limitation on the functions and scope of use of the embodiments of the present disclosure.

As shown in FIG. 12, the electronic device 900 may include a processing device (e.g., a central processor, a graphics processor, etc.) 901 that may perform various appropriate actions and processes based on a program stored in a Read Only Memory ("ROM") 902 or loaded from a storage device 908 into a Random Access Memory ("RAM") The program loaded from the storage device 908 into the Random Access Memory (RAM) 903 performs various appropriate actions and processes. Also stored in the RAM 903 are various programs and data necessary for the operation of the electronic device 900. The processing device 901, the ROM 902, and the RAM 903 are connected to each other via a bus 904. Input/output (I/O) interfaces 905 are also connected to the bus 904.

Typically, the following devices may be connected to the I/O interface 905: an input device 906 including, for example, a touch screen, a touch pad, a keyboard, a mouse, a camera, a microphone, an accelerometer, a gyroscope, and the like; an output device 907 including, for example, a Liquid Crystal Display (LCD), a speaker, a vibrator, and the like; a storage device 908 including, for example, a magnetic tape, a hard disk, and the like; and a communication device 909. The communication device 909 may allow the electronic device 900 to communicate wirelessly or wiredly with other devices to exchange data. While FIG. 12 illustrates electronic device 900 with various devices, it should be understood that it is not required to implement or have all of the illustrated devices. More or fewer devices may alternatively be implemented or possessed.

In particular, according to embodiments of the present disclosure, the process described above with reference to the flowchart may be implemented as a computer software program. For example, embodiments of the present disclosure include a computer program product including a computer program carried on a computer readable medium, the computer program including program code for performing the method shown in the flowchart. In such embodiments, the computer program may be downloaded and installed from a network via a communication device 909, or from a storage device 908, or from a ROM 902. At the time that the computer program is executed by the processing device 901, the above-described functions defined in the method of embodiments of the present disclosure are performed.

It is noted that the computer-readable medium described above in the present disclosure may be a computer-readable signaling medium or a computer-readable storage medium or any combination thereof. The computer-readable storage medium may, for example, be—but is not limited to—a system, device, or apparatus, or device of electricity, magnetism, light, electromagnetism, infrared, or semiconductors, or any combination of the above. More specific examples of computer-readable storage medium may include, but are not limited to: electrical connections having one or more wires, portable computer disks, hard disks, random access memory (RAM), read-only memory (ROM), erasable programmable read-only memory (EPROM or flash memory), optical fibers, portable compact disk read-only memories (CD-ROM), optical storage devices, magnetic memory device, or any suitable combination of the foregoing. In the context of the present disclosure, a computer-readable storage medium may be any tangible medium containing or storing a program that may be used by or in combination with an instruction execution system, apparatus, or device. And in the context of the present disclosure, a computer-readable signal medium may include a data signal propagated in a baseband or as part of a carrier that carries computer-readable program code. Such propagated data signals may take a variety of forms, including, but not limited to, electromagnetic signals, optical signals, or any suitable combination of the foregoing. The computer-readable signal medium may also be any computer-readable medium other than a computer-readable storage medium that sends, propagates, or transmits a program for use by, or in combination with, an instruction-executing system, apparatus, or device. The program code contained on the computer-readable medium may be transmitted using any suitable medium, including, but not limited to: wire, fiber optic cable, RF (radio frequency), etc., or any suitable combination of the foregoing.

The above-described computer-readable medium may be contained in the above-described electronic device; or it may be present separately and not assembled into the electronic device.

The above-described computer-readable medium carries one or more programs which, when the said one or more programs are executed by the electronic device, cause the electronic device to execute the method shown in the above embodiment.

Computer program code for performing the operations of the present disclosure may be written in one or more programming languages or combinations thereof, including object-oriented programming languages—such as Java, Smalltalk, C++—and conventional procedural programming languages—such as the "C" language or the like. "C" or similar programming languages. The program code may be executed entirely on the user's computer, partially on the user's computer, as a stand-alone software package, partially on the user's computer and partially on a remote computer, or entirely on a remote computer or server. In situations involving a remote computer, the remote computer may be connected to the user computer via any kind of network—including a Local Area Network (LAN) or a Wide Area Network (WAN)—or, alternatively, may be connected to an external computer. computer, or it may be connected to an external computer (e.g., by using an Internet Service Provider to connect over the Internet).

The flowcharts and block diagrams in the accompanying drawings illustrate the architecture, functionality, and operation of systems, methods, and computer program products that may be implemented in accordance with various embodiments of the present disclosure. At this point, each box in the flowcharts or block diagrams tray represent a module, program segment, or portion of code that contains one or more executable instructions for implementing a specified logical function. It should also be noted that in some implementations as replacements, the functions labeled in the boxes may also occur in a different order than those labeled in the accompanying drawings. For example, two consecutively represented boxes may actually be executed substantially in parallel, and they may sometimes be executed in reverse order, depending on the function involved. It should also be noted that each of the boxes in the block diagrams and/or flowcharts, and combinations of the boxes in the block diagrams and/or flowcharts, may be implemented with a specialized hardware-based system that performs the specified function or operation, or may be implemented with a combination of specialized hardware and computer instructions.

The units described in the embodiments of the present disclosure may be implemented by way of software or by way of hardware. Wherein the name of the unit does not in some cases constitute a limitation of the unit itself, for example, the first acquisition unit may also be described as "a unit for acquiring at least two Internet Protocol addresses".

The functions described above herein may be performed, at least in part, by one or more hardware logic components. For example, non-limitingly, exemplary types of hardware logic components that may be used include: field programmable gate array (FPGA), application-specific integrated circuit (ASIC), application-specific standard product (ASSP), systems-on-chip (SOC), complex programmable logic device (CPLD), and the like.

In the context of the present disclosure, a machine-readable medium may be a tangible medium that may contain or store a program for use by or in conjunction with an instruction execution system, device, or apparatus. The machine-readable medium may be a machine-readable signal medium or a machine-readable storage medium. The machine-readable medium may include, but is not limited to, an electronic, magnetic, optical, electromagnetic, infrared, or semiconductor system, device, or apparatus, or any suitable combination of the foregoing. More specific examples of machine-readable storage medium would include electrical connections based on one or more wires, portable computer disks, hard disks, random access memory (RAM), read-only memory (ROM), erasable programmable read-only memory (EPROM or flash memory), optical fibers, convenient compact disk read-only memory (CD-ROM), optical storage devices, magnetic storage devices, or any suitable combination of the foregoing. any suitable combination of the above.

In a first aspect, according to one or more embodiments of the present disclosure, there is provided a method of controlling a microservice governance service, comprises:
receiving a first message sent by a business unit, wherein the first message is a remote procedure call message including a business request; querying an action link table by using a message feature of the first message as a query criteria; in accordance with a determination that a corresponding action link in the action link table is hit, determining the hit action link as a target action link, wherein the action link table is stored in a microservice governance unit and used for processing the first message to implement a microservice governance for the business unit, the target action link includes at least two action nodes for consecutively executing, and the action nodes are configured to implement a governance action of the microservice governance; and running the target action link to consecutively execute governance actions corresponding to the action nodes.

According to one or more embodiments of the present disclosure, querying the action link table by using a message feature of the first message as a query criteria further comprises:
in accordance with a determination that no action link in the action link table is hit, obtaining a predetermined standard governance logic, wherein the standard governance logic includes at least one execution function and at least one connection function, the execution function is configured to trigger a governance action, and the connection function is configured to obtain an execution parameter required for executing the governance action and/or a trigger condition for determining the governance action; obtaining target configuration information based on the message feature of the first message, the target configuration information indicating a microservice governance corresponding to the message feature of the first message; configuring the standard governance logic based on the target configuration information to obtain a target governance logic; and processing the first message based on a connection function and an execution function in the target governance logic to execute a governance action corresponding to the microservice governance.

According to one or more embodiments of the present disclosure, after processing the first message based on the connection function and the execution function in the target governance logic to execute each governance action corresponding to the microservice governance, the method further comprises:
obtaining execution information of the target governance logic, wherein the execution information represents an execution parameter and/or an execution result of the execution function in the target governance logic; generating a target action link corresponding to the message feature of the first message based on the execution information; and storing the target action link in the action link table.

According to one or more embodiments of the present disclosure, querying an action link table by using a message feature of the first message as a query criteria comprises:
obtaining the message feature corresponding to the first message by extracting features from the first message, wherein the message feature represents a content feature of the business request; and querying an action link table based on the message feature to obtain a query result.

According to one or more embodiments of the present disclosure, the obtaining the message feature corresponding to the first message by extracting features from the first message comprises:
decoding the first message to obtain a decoded message; and obtaining the message feature based on a field value of a target field of the decoded message.

According to one or more embodiments of the present disclosure, the action link table includes a feature identifier for representing a message feature of a first message and a link identifier for mapping an action link that matches the message feature.

According to one or more embodiments of the present disclosure, the action node includes at least one execution function for triggering a governance action and a corresponding execution parameter, and wherein running the target action link to consecutively execute governance actions corresponding to the action nodes comprises:
obtaining execution functions in action nodes in the target action link and corresponding execution parameters; and executing, based on the execution parameters, corresponding execution functions in sequence to trigger a corresponding governance action.

According to one or more embodiments of the present disclosure, includes at least one of the following: a microservice governance unit is deployed in a sidecar container, a business unit is deployed in a business container, and the sidecar container and the business container are located in a same container pod; and the sidecar container is implemented based on a first process in the container pod, and the business container is implemented based on a second process in the container pod.

In a second aspect, according to one or more embodiments of the present disclosure, there is provide an apparatus for controlling a microservice governance service, includes:
a receiving module configured to receive a first message sent by a business unit, wherein the first message is a remote procedure call message including a business request;
a querying module configured to query an action link table by using a message feature of the first message as a query criteria; in accordance with a determination that a corresponding action link in the action link table is hit, determine the hit action link as a target action link, wherein the action link table is stored in a microservice governance unit and used for processing the first message to implement a microservice governance for the business unit, the target action link includes at least two action nodes for consecutively executing, and the action nodes are configured to implement a governance action of the microservice governance; and
an executing module configured to run the target action link to consecutively execute governance actions corresponding to the action nodes.

According to one or more embodiments of the present disclosure, the querying module is further used for: in accordance with a determination that no action link in the action link table is hit, obtaining a predetermined standard governance logic, wherein the standard governance logic includes at least one execution function and at least one connection function, the execution function is configured to trigger a governance action, and the connection function is configured to obtain an execution parameter required for executing the governance action and/or a trigger condition for determining the governance action; obtaining target configuration information based on the message feature of the first message, the target configuration information indicating a microservice governance corresponding to the message feature of the first message; configuring the standard governance logic based on the target configuration information to obtain a target governance logic; and processing the first message based on a connection function and an execution function in the target governance logic to execute a governance action corresponding to the microservice governance.

According to one or more embodiments of the present disclosure, after processing the first message based on the connection function and the execution function in the target governance logic to execute each governance action corresponding to the microservice governance, the querying module is further used for: obtaining execution information of the target governance logic, wherein the execution information represents an execution parameter and/or an execution result of the execution function in the target governance logic; generating a target action link corresponding to the message feature of the first message based on the execution information; and storing the target action link in the action link table.

According to one or more embodiments of the present disclosure, the querying module, when querying an action link table by using a message feature of the first message as a query criteria, is specifically used for: obtaining the message feature corresponding to the first message by extracting features from the first message, wherein the message feature represents a content feature of the business request; and querying an action link table based on the message feature to obtain a query result.

According to one or more embodiments of the present disclosure, the obtaining the message feature corresponding to the first message by extracting features from the first message, is specifically used for: decoding the first message to obtain a decoded message; and obtaining the message feature based on a field value of a target field of the decoded message.

According to one or more embodiments of the present disclosure, the action link table includes a feature identifier for representing a message feature of a first message and a link identifier for mapping an action link that matches the message feature.

According to one or more embodiments of the present disclosure, the action node includes at least one execution function for triggering a governance action and a corresponding execution parameter; The executing module is specifically used for: obtaining execution functions in action nodes in the target action link and corresponding execution parameters; and executing, based on the execution parameters, corresponding execution functions in sequence to trigger a corresponding governance action.

According to one or more embodiments of the present disclosure, includes at least one of the following: a microservice governance unit is deployed in a sidecar container, a business unit is deployed in a business container, and the sidecar container and the business container are located in a same container pod; and the sidecar container is implemented based on a first process in the container pod, and the business container is implemented based on a second process in the container pod.

In a third aspect, according to one or more embodiments of the present disclosure, there is provided an electronic device comprising: a processor, and a memory connected with the processor,
the memory storing computer execution instruction;
the processor executing the computer execution instruction stored in the memory to implement a method for controlling a microservice governance service as described in the first aspect and various possible designs of the first aspect.

In a fourth aspect, according to one or more embodiments of the present disclosure, a computer-readable storage medium is provided, wherein computer execution instructions are stored. When the processor executes the computer execution instructions, the method of controlling a microservice governance service described in the first aspect and various possible designs of the first aspect is implemented.

In a fifth aspect, embodiments of the present disclosure provide a computer program product including a computer program that, when executed by a processor, implements method of controlling a microservice governance services as described in the first aspect and various possible designs of the first aspect.

The above description is only a preferred embodiment of the present disclosure and an illustration of the technical principles utilized. It should be understood by those skilled in the art that the scope of disclosure involved in the present disclosure is not limited to technical solutions formed by a particular combination of the above technical features, but also covers other technical solutions formed by any combination of the above technical features or their equivalent features without departing from the above disclosed concept. For example, a technical solution formed by interchanging the above features with (but not limited to) technical features with similar functions disclosed in the present disclosure.

Furthermore, while the operations are depicted using a particular order, this should not be construed as requiring that the operations be performed in the particular order shown or in sequential order of execution. Multitasking and parallel processing may be advantageous in certain environments. Similarly, while several specific implementation details are included in the above discussion, these should not be construed as limiting the scope of the present disclosure. Certain features described in the context of separate embodiments may also be implemented in combination in a single embodiment. Conversely, various features described in the context of a single embodiment may also be implemented in multiple embodiments, either individually or in any suitable sub-combination.

Although the present subject matter has been described using language specific to structural features and/or method logic actions, it should be understood that the subject matter limited in the appended claims is not necessarily limited to the particular features or actions described above. Rather, the particular features and actions described above are merely exemplary forms of realizing the claims.

We claim:
1. A method of controlling a microservice governance service comprising:
receiving a first message sent by a business unit, wherein the first message is a remote procedure call message comprising a business request;

querying an action link table by using a message feature of the first message as a query criteria;

in accordance with a determination that a corresponding action link in the action link table is hit, determining the hit action link as a target action link, wherein the action link table is stored in a microservice governance unit and used for processing the first message to implement a microservice governance for the business unit, the target action link comprises at least two action nodes for consecutively executing, and the action nodes are configured to implement a governance action of the microservice governance;

in accordance with a determination that no action link in the action link table is hit, generating, after execution of a target governance logic for the first message, a target action link corresponding to the message feature of the first message, and storing the target action link in the action link table; and running the target action link to consecutively execute governance actions corresponding to the action nodes.

2. The method of claim 1, wherein querying the action link table by using a message feature of the first message as a query criteria further comprises:

in accordance with a determination that no action link in the action link table is hit, obtaining a predetermined standard governance logic, wherein the standard governance logic comprises at least one execution function and at least one connection function, the execution function is configured to trigger a governance action, and the connection function is configured to obtain an execution parameter required for executing the governance action and/or a trigger condition for determining the governance action;

obtaining target configuration information based on the message feature of the first message, the target configuration information indicating a microservice governance corresponding to the message feature of the first message;

configuring the standard governance logic based on the target configuration information to obtain the target governance logic; and processing the first message based on a connection function and an execution function in the target governance logic to execute a governance action corresponding to the microservice governance.

3. The method of claim 2, wherein after processing the first message based on the connection function and the execution function in the target governance logic to execute each governance action corresponding to the microservice governance, the method further comprises:

obtaining execution information of the target governance logic, wherein the execution information represents an execution parameter and/or an execution result of the execution function in the target governance logic;

generating a target action link corresponding to the message feature of the first message based on the execution information; and storing the target action link in the action link table.

4. The method of claim 1, wherein querying an action link table by using a message feature of the first message as a query criteria comprises:

obtaining the message feature corresponding to the first message by extracting features from the first message, wherein the message feature represents a content feature of the business request; and querying an action link table based on the message feature to obtain a query result.

5. The method of claim 4, wherein the obtaining the message feature corresponding to the first message by extracting features from the first message comprises:

decoding the first message to obtain a decoded message; and obtaining the message feature based on a field value of a target field of the decoded message.

6. The method of claim 1, wherein the action link table comprises a feature identifier for representing a message feature of a first message and a link identifier for mapping an action link that matches the message feature.

7. The method of claim 1, wherein the action node comprises at least one execution function for triggering a governance action and a corresponding execution parameter, and wherein running the target action link to consecutively execute governance actions corresponding to the action nodes comprises:

obtaining execution functions in action nodes in the target action link and corresponding execution parameters; and executing, based on the execution parameters, corresponding execution functions in sequence to trigger a corresponding governance action.

8. The method of claim 1, wherein a microservice governance unit is deployed in a sidecar container, a business unit is deployed in a business container, and the sidecar container and the business container are located in a same container pod; and the sidecar container is implemented based on a first process in the container pod, and the business container is implemented based on a second process in the container pod.

9. An electronic device comprising: a processor, and a memory connected with the processor, the memory storing computer execution instruction;

the processor executing the computer execution instruction stored in the memory to implement a method for controlling a microservice governance service, the method comprising:

receiving a first message sent by a business unit, wherein the first message is a remote procedure call message comprising a business request;

querying an action link table by using a message feature of the first message as a query criteria;

in accordance with a determination that a corresponding action link in the action link table is hit, determining the hit action link as a target action link, wherein the action link table is stored in a microservice governance unit and used for processing the first message to implement a microservice governance for the business unit, the target action link comprises at least two action nodes for consecutively executing, and the action nodes are configured to implement a governance action of the microservice governance;

in accordance with a determination that no action link in the action link table is hit, generating, after execution of a target governance logic for the first message, a target action link corresponding to the message feature of the first message, and storing the target action link in the action link table; and running the target action link to consecutively execute governance actions corresponding to the action nodes.

10. The electronic device of claim 9, wherein querying the action link table by using a message feature of the first message as a query criteria further comprises:

in accordance with a determination that no action link in the action link table is hit, obtaining a predetermined standard governance logic, wherein the standard governance logic comprises at least one execution function and at least one connection function, the execution function is configured to trigger a governance action, and the connection function is configured to obtain an execution parameter required for executing the governance action and/or a trigger condition for determining the governance action;

obtaining target configuration information based on the message feature of the first message, the target configuration information indicating a microservice governance corresponding to the message feature of the first message;

configuring the standard governance logic based on the target configuration information to obtain the target governance logic; and processing the first message based on a connection function and an execution function in the target governance logic to execute a governance action corresponding to the microservice governance.

11. The electronic device of claim 10, wherein after processing the first message based on the connection function and the execution function in the target governance logic to execute each governance action corresponding to the microservice governance, the method further comprises:

obtaining execution information of the target governance logic, wherein the execution information represents an execution parameter and/or an execution result of the execution function in the target governance logic;

generating a target action link corresponding to the message feature of the first message based on the execution information; and storing the target action link in the action link table.

12. The electronic device of claim 9, wherein querying an action link table by using a message feature of the first message as a query criteria comprises:

obtaining the message feature corresponding to the first message by extracting features from the first message, wherein the message feature represents a content feature of the business request; and querying an action link table based on the message feature to obtain a query result.

13. The electronic device of claim 12, wherein the obtaining the message feature corresponding to the first message by extracting features from the first message comprises:

decoding the first message to obtain a decoded message; and obtaining the message feature based on a field value of a target field of the decoded message.

14. The electronic device of claim 9, wherein the action link table comprises a feature identifier for representing a message feature of a first message and a link identifier for mapping an action link that matches the message feature.

15. The electronic device of claim 9, wherein the action node comprises at least one execution function for triggering a governance action and a corresponding execution parameter, and wherein running the target action link to consecutively execute governance actions corresponding to the action nodes comprises:

obtaining execution functions in action nodes in the target action link and corresponding execution parameters; and executing, based on the execution parameters, corresponding execution functions in sequence to trigger a corresponding governance action.

16. The electronic device of claim 9, wherein a microservice governance unit is deployed in a sidecar container, a business unit is deployed in a business container, and the sidecar container and the business container are located in a same container pod; and the sidecar container is implemented based on a first process in the container pod, and the business container is implemented based on a second process in the container pod.

17. A non-transitory computer-readable storage medium on which computer execution instructions are stored, the computer execution instructions, when executed by a processor, implementing a method for controlling a microservice governance service, the method comprising:

receiving a first message sent by a business unit, wherein the first message is a remote procedure call message comprising a business request;

querying an action link table by using a message feature of the first message as a query criteria;

in accordance with a determination that a corresponding action link in the action link table is hit, determining the hit action link as a target action link, wherein the action link table is stored in a microservice governance unit and used for processing the first message to implement a microservice governance for the business unit, the target action link comprises at least two action nodes for consecutively executing, and the action nodes are configured to implement a governance action of the microservice governance;

in accordance with a determination that no action link in the action link table is hit, generating, after execution of a target governance logic for the first message, a target action link corresponding to the message feature of the first message, and storing the target action link in the action link table; and running the target action link to consecutively execute governance actions corresponding to the action nodes.

18. The non-transitory computer-readable storage medium of claim 17, wherein querying the action link table by using a message feature of the first message as a query criteria further comprises:

in accordance with a determination that no action link in the action link table is hit, obtaining a predetermined standard governance logic, wherein the standard governance logic comprises at least one execution function and at least one connection function, the execution function is configured to trigger a governance action, and the connection function is configured to obtain an execution parameter required for executing the governance action and/or a trigger condition for determining the governance action;

obtaining target configuration information based on the message feature of the first message, the target configuration information indicating a microservice governance corresponding to the message feature of the first message;

configuring the standard governance logic based on the target configuration information to obtain the target governance logic; and processing the first message based on a connection function and an execution function in the target governance logic to execute a governance action corresponding to the microservice governance.

19. The non-transitory computer-readable storage medium of claim 18, wherein after processing the first message based on the connection function and the execution function in the target governance logic to execute each governance action corresponding to the microservice governance, the method further comprises:

obtaining execution information of the target governance logic, wherein the execution information represents an execution parameter and/or an execution result of the execution function in the target governance logic;

generating a target action link corresponding to the message feature of the first message based on the execution information; and storing the target action link in the action link table.

20. The non-transitory computer-readable storage medium of claim 17, wherein querying an action link table by using a message feature of the first message as a query criteria comprises:

obtaining the message feature corresponding to the first message by extracting features from the first message, wherein the message feature represents a content feature of the business request; and querying an action link table based on the message feature to obtain a query result.

\* \* \* \* \*